United States Patent [19]
Finch et al.

[11] Patent Number: 5,235,610
[45] Date of Patent: Aug. 10, 1993

[54] PRISM GAIN MODULE AND METHOD

[75] Inventors: Andrew Finch; James Harrison, both of Cambridge, Mass.

[73] Assignee: Schwartz Electro Optics, Inc., Orlando, Fla.

[21] Appl. No.: 759,593

[22] Filed: Sep. 16, 1991

[51] Int. Cl.[5] ............................................. H01S 3/08
[52] U.S. Cl. ...................................... 372/92; 372/41; 372/70
[58] Field of Search ........................ 372/41, 70, 72, 92

[56] References Cited
U.S. PATENT DOCUMENTS

| | | | |
|---|---|---|---|
| 4,803,696 | 2/1989 | Pepper et al. | 372/92 |
| 4,910,746 | 3/1990 | Nicholson | 372/41 |

Primary Examiner—John D. Lee
Assistant Examiner—Robert E. Wise
Attorney, Agent, or Firm—Allen, Dyer, Doppelt, Franjola & Milbrath

[57] ABSTRACT

A prism gain module is placed in a resonator for generating or amplifying coherent light energy. The module has a first and second side each with a planar surface. The surfaces are partially coated with a reflective material. The first and second sides are angled so that a resonator beam path is formed within the module such that coherent light energy enters an uncoated surface on the first side of the module of Brewster's angle, reflects off of the reflective material on the second and first sides, and then exits the module through the second side with an exit angle also equal to Brewster's angle. The prism gain module provides pump position flexibility by permitting coherent light energy to pump the gain module from multiple sides so long as the coherent light energy is focused along the beam path.

13 Claims, 2 Drawing Sheets

PRISM GAIN MODULE AND METHOD

The invention was made with Government support under Contract N66001-88-C-0095 awarded by Naval Ocean Systems Center. The Government has certain rights in the invention.

BACKGROUND OF THE INVENTION

This invention relates to a prism gain module and method for using the same. More particularly, this invention relates to a prism gain module for use in a resonator for amplifying or generating coherent light energy.

Crystal modules have been pumped with coherent light energy at one frequency generated by a semiconductor laser diode array focused along beam paths with the module. The crystal module responds to the coherent light energy at the first frequency by lasing coherent light energy at another frequency along the beam path. Examples of these modules are disclosed in U.S. Pat. Nos. 4,764,933 and 4,783,170.

However, the positioning of these modules are limited as the laser diode array must be affixed in preset locations adjacent to the module to provide proper focusing along the path. It is desirable to scale the power of the module by focusing the output of many diodes along the beam path. The more diodes along the path, the greater the power generated by the modules. Due to the limitation of laser diode placement around prior modules, power output and power scaling is limited. Further, increasing power output of the modules requires an increase in size of the module.

It is also desirable to generate or amplify coherent light energy in a ring cavity at a single frequency. A drawback to many of the prior art modules is that they are not readily adaptable to high pump power operation and still provide single frequency operation.

SUMMARY OF THE INVENTION

An object of this invention is to provide an improved prism gain module and method for using the same.

Another object of the invention is to place a prism gain module in a resonator that has a tunable output frequency.

A further object of this invention is to construct a prism gain module that amplifies or generates coherent light energy that has flexible pump geometries to allow flexibility in positioning and power scaling.

The above objects are provided with a prism gain module with refractive index of n. Suitable materials are Nd:YAG and most homogeneous, isotropic laser gain media. The gain module comprises a crystal slab designed to receive coherent light energy pumped into the crystal at a first frequency and is responsive to the pumped laser light by lasing laser light at second frequency. The crystal has a first side and a second side. The first and second side each have a planar surface oriented such that the plane of the first and the second surface intersect at an angle in radians of $(\pi - 2 \tan^{-1} n)/3$. A base side preferably extends between the first and second side. Preferably, the gain module includes a reflective coating extending partially along the first and second planar surfaces. The coating is selected to be reflective for the second frequency while being transmissive for the first frequency.

The prism gain module will be an integral part of a laser resonator but is not required to act as a single frequency source. Rather, the prism gain module provides the gain necessary for the complete resonator to be a single frequency source. Preferably the prism gain module is placed in a ring cavity resonator where light will travel along a circular resonator beam path reflecting off turning mirrors with radius of curvature $R_1$ and $R_2$, through the prism gain module and into an etalon that provides tuning. If single frequency operation of the gain module is required, an optical diode would be inserted in the path of the ring cavity to force light to travel along the beam path in only one direction. The resonator beam path intersects the prism gain module at Brewster's angle.

The prism gain module's reflective coating extends approximately halfway up each of the angle sides of the crystal slab and preferably down to its base. The resonator beam path contacts the coating on the surface of the crystal. The gain module is pumped with light along the module's sides. The light is focused along the beam path and may pass through the coatings. Further, pump light is preferably generated using a laser diode bar and can be fed through the base of the prism gain module via a cylindrical lens. Thus, a coated module provides a great deal of flexibility in the positioning of a pumping source and of focusing optics. The crystal slab may be shaped to permit many pump lasers to simultaneously pump the gain module allowing a larger amount of power to be introduced into a single crystal slab with the resultant laser having a large output power.

DESCRIPTION OF THE PREFERRED EMBODIMENTS

Figure 1:
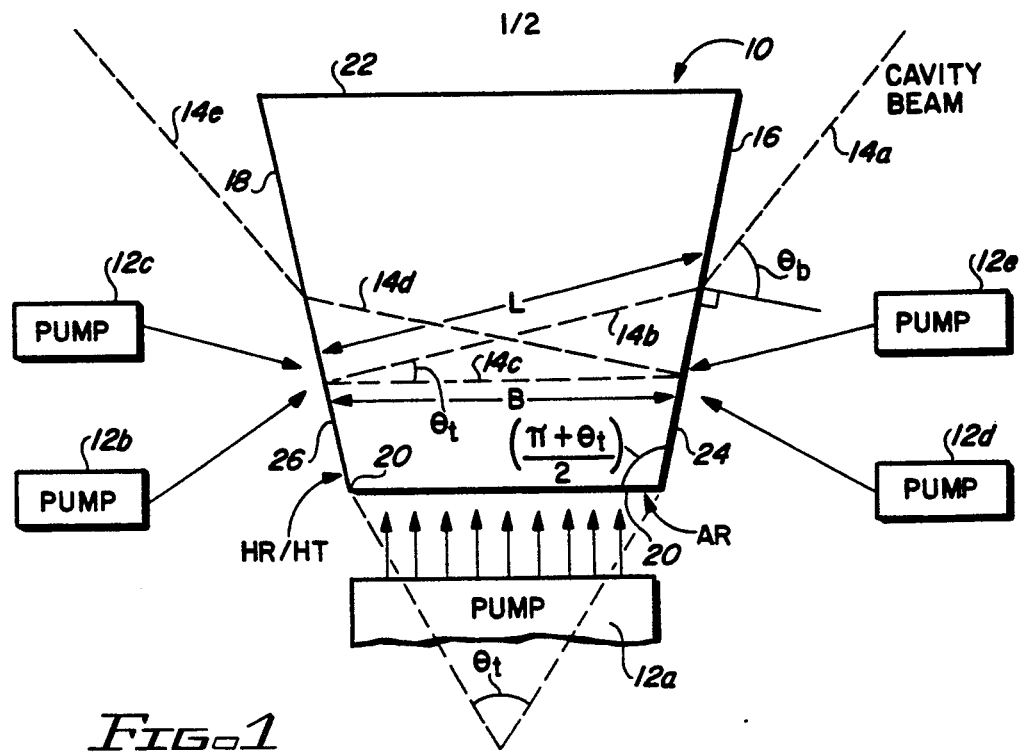
FIG. 1 is a top view of the prism gain module and beam path within the module.

Referring to FIG. 1 there is shown a prism gain module 10 which is pumped with coherent light energy from pumps 12(a-e), disposed at various locations around module 10. Coherent light energy is transmitted along a path designated by numbers 14(a-e) through module 10.

Prism gain module 10 is constructed from a crystalline-slab material having a refractive index of n, preferably neodymium doped YAG (Nd:YAG) or any isotropic solid state laser material. Gain module 10 has a first flat side 16 with a first planar surface and second flat side 18, with a second planar surface angled so that the plane of each respective surface converges. The angle between the plane of the first surface 16 and the plane of the second surface 18 is selected to be in radians $(\pi - 2 \tan^{-1} n)/3$. Accordingly, when coherent light energy along path 14a strikes first surface 16 at an angle of $\tan^{-1} n$ with respect to the normal of the first surface 16, the coherent light energy is transmitted into module 10 along path 14b. A base planar surface of third side 20 extends between first side 16 and second side 18. Fourth side 22 having a planar surface extends parallel to third side 20 between first side 16 and second side 18.

Figure 2:
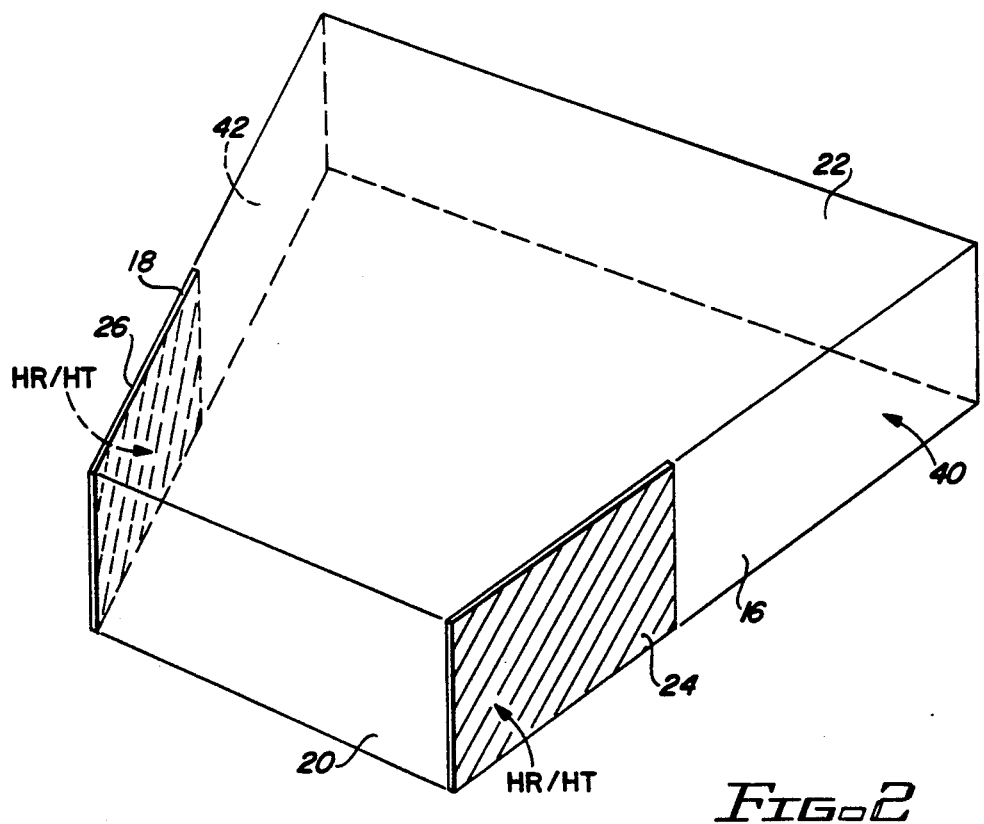
FIG. 2 is a perspective view of the gain module shown in FIG. 1.

Referring to FIGS. 1 and 2, coated on a portion of the surface of first side 16 and second side 18 adjacent to third side 20 is a reflective material 24 and 26. Another portion 40 and 42 of first and second side 16 and 18 respectively remain uncoated. Reflective material 24 and 26 is preferably a multi-layer dielectric coating manufactured by Virgo Optics of Port Richey, Fla. The preferred characteristic of reflective material 24 and 26 is that it has a high transmission of light for the pump frequency, while having a high reflectivity for the frequency of the coherent light energy transmitted along path 14. The uncoated portions 40 and 42 are preferably laser polished. Surface 20 should also be coated with an antireflection coating for the pump frequency.

Figure 3:
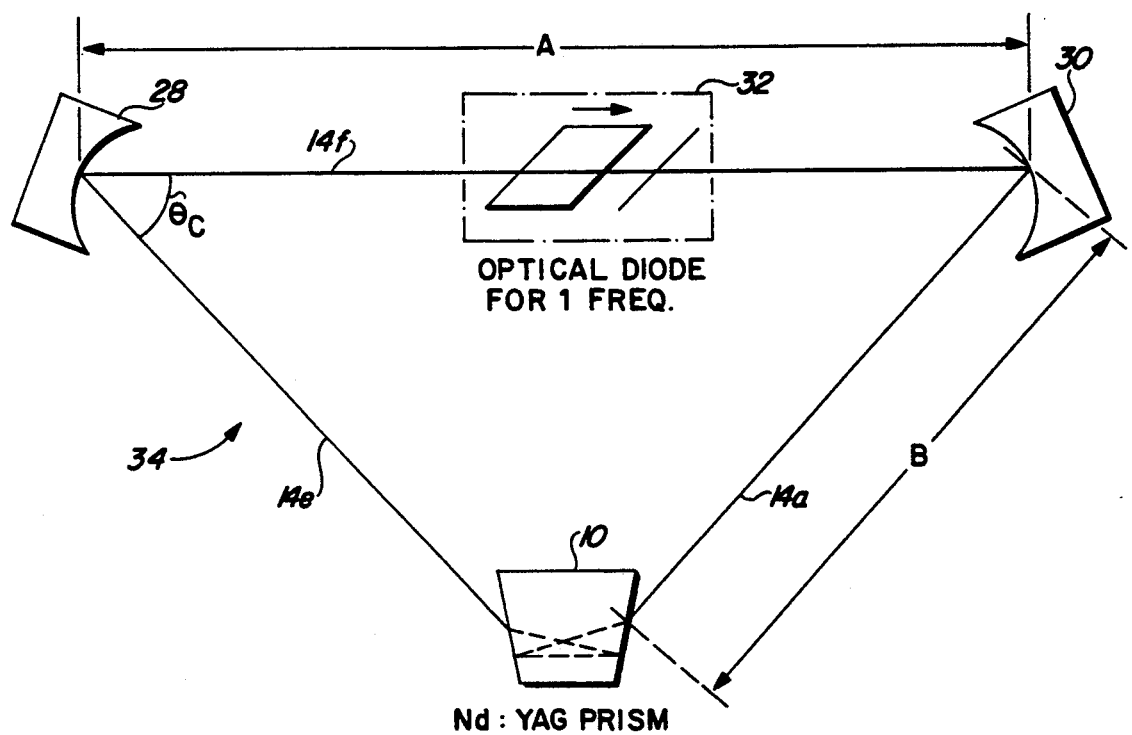
FIG. 3 is a simplified schematic diagram of a prism gain module resonator.

Referring to FIG. 3, there is shown a resonator 34 having a first and second reflector 28 and 30 optically coupled to module 10. Coherent light energy travels in a resonator 34 along paths 14a, 14e and 14f. Specifically, coherent light energy exits prism gain module 10 along path 14a or 14e, reflects off either reflector 28 with radius of curvature $R_1$ or reflector 30 with radius of curvature $R_2$ onto path 14f where the coherent light energy is reflected off the other reflector 30 or reflector 28 and back to gain module 10. Either reflectors 28 or 30 can have partial transmission characteristics for the coherent light to allow coupling of this energy to outside the resonator. Preferably, an optical diode 32 is placed in the path 14f between the reflectors 28 and 30 to limit coherent light energy direction of travel to one direction along path 14f, thereby limiting the coherent light energy in the resonator to a single frequency. An etalon may be placed between reflectors 28 and 30 to tune the frequency of the coherent light energy in resonator 34.

Referring to FIGS. 1 and 2, paths 14a and 14b intersect the section of gain module 10 on opposing first and second sides 16 and 18 at Brewster's angle $\Theta_b$, where $\Theta_b = \tan^{-1} n$. Incidence to module 10 at this angle ensures minimal insertion loss of the coherent light energy when module 10 is used with resonator 34.

For purposes of example, angles and reflections within prism gain module 10 will be explained with coherent light energy traveling in one direction where coherent light energy enters module 10 along surface 16; however, prism gain module 10 is in no way limited to reflecting coherent light energy entering module 10 through the first side 16 and may reflect and amplify coherent light energy entering module 10 through second side 18 as well. Coherent light energy transmitted along path 14a strikes side 16, at portion 40 at Brewster's angle ($\Theta_b$ with respect to the normal of surface 10) and is transmitted through surface 16 along path 14b within module 10. Coherent light energy then intersects the surface of second side 18 and reflects from material 26 onto path 14c where coherent light energy intersects first surface of first side 16 and reflects off of material 24 onto path 14d. Reflective materials 24 and 26 are designed for maximum reflection at the wavelength of coherent light energy transmitted along path 14(a-b) (1.064 micrometers for Nd:YAG). Reflective materials 24 and 26 maintain a transmission greater than 90% at the pump wavelength (0.81 micrometers for Nd:YAG). The internal angle of incidence where the coherent light energy strikes sides 16 and 18, i.e., half the angle between paths 14b and 14c and between paths 14c and 14d, is equal to $\Theta_t/2$ where $\Theta_t = (\pi - 2\Theta_b)/3$. The length of path 14c is defined by D, and L is the distance along paths 14b and 14d, where L=D cosine ($\frac{1}{2}\Theta_t$)/sine $\Theta_b$. Typical lengths for 1% doped Nd:YAG for D are 5–10 mm. Length D, and hence overall dimension of gain module, is chosen to match the absorption coefficient of the material used to the pump frequency; this absorption coefficient is a function of dopant and doping level.

Prism gain module 10 is excited by pumps 12(b–e) located at different positions around gain module's 10 perimeter. Longitudinal pumping of gain module 10 is possible along paths 14(b–d) on both sides 16 and 18 of prism gain module 10. In addition, gain module 10 can be transversed pumped with pump 12a which is introduced into gain module 10 through third side 20. The pumping of gain module 10 is preferably accomplished using high-powered diode laser bars which are typically about one-centimeter long. A cylindrical lens could be used by focusing the coherent light energy for pumps 12(b–e) through reflector material 24 and 26 onto path 12(b–e).

The distance between reflectors 28 and 30 along path 14f is defined as "A". Distance along both paths 14a and 14b between reflectors 28 or 30 and module 10 is defined by B, where "B"=(A−L)/(2 cos ($\Theta_b - (\frac{1}{2})\Theta_t$)). Examples values are provided in Table 1.

TABLE 1

|  | Degrees (not radians) |
|---|---|
| $\Theta_b$ | 61.2° |
| $\Theta_t$ | 19.2° |
| $\Theta_c$ | 51.6° |
| D | 7 mm |
| L | 8 mm |
| A | 13.5 cm |
| B | 10.2 cm |
| $R_1 = R_2$ | 25 cm |

To facilitate pumping through third side 20, the base dimension "D" of the module 10 should be slightly longer than available diode bars that would be used to pump module 10 (approximately one centimeter). The position of path 14c should be maintained close to (approximately 1 mm) third side 20. Further, the coating length of reflective material 24 and 26 extending along first surface of side 16 and second surface of side 18 should be adequate to reflect coherent light energy along path 14b, 14c or 14d. It is preferable that material 24 and 26 cover an area on first side 16 and second side 18 at least three times the diameter of the coherent light energy beam on path 14c in module 10. Reflector material 24 or 26 should not extend too far into uncoated portions 40 and 42 of first side 16 and second side 18 to reflect coherent light energy incident and exiting module 10 on paths 14a and 14e. It is also preferable that the thickness of module 10 be greater than three times the diameter of the coherent light energy beam, preferably 3 mm for an Nd:YAG module.

Typically, for a neodymium YAG module with the cavity dimensions listed in Table 1, the length of reflective material 24 and 26 is limited to between 1.5–2 millimeters. If the module is not to be pumped with pumps 12a through third surface 20, then the length of reflector material 24 and 26 and the position of path 12c relative to third surface 20 is not critical. However, the uncoated aperture along side 16 and 18 must be of sufficient size, preferably three times the diameter of the beam of coherent light energy along path 14a or 14e, to allow incident and exit beams through gain module 10.

This concludes the description of the preferred embodiments. A reading by those skilled in the art will bring to mind various changes without departing from the spirit and scope of the invention. It is intended, however, that the invention only be limited by the following appended claims.

What is claimed is:

1. A prism gain module with a refractive index of n, the module comprising:
   a crystal to operative to receive coherent light energy pumped into said crystal at a first frequency and being responsive to the pumped laser light by lasing laser light at a second frequency, said crystal having a first side with a first planar surface; and
   said crystal having a second side with a second planar surface where the plane of the first and second surface intersect said plane of the first surface having an angle in radians of $(\pi - 2\tan^{-1} n)/3$ with respect to the plane of the second surface.

2. The module as recited in claim 1 further comprising:
   a reflective coating extending partially along the surface and first and second side, said coating having reflectivity characteristics that substantially reflect said second frequency and pass said first frequency.

3. The module as recited in claim 1 further comprising:
   means for pumping coherent light energy at the first frequency into said crystal, and for focusing said coherent light energy at the first frequency along a cavity beam path.

4. A prism gain module resonator comprising:
   pumping means for generating coherent light energy at a first frequency;
   a prism gain module coupled to said generating means and constructed from a crystalline material with a refractive index of n, said crystal having a first, second and third side where the second side is juxtaposed between the first and second side, said first and second side having a planar surface where the angle in radians between the plane of the first surface and the second surface is defined by $(\pi - 2\tan^{-1} n)/3$, said crystalline material being responsive to said coherent light energy at the first frequency by generating coherent light energy that exits said second side at a second frequency along a beam path;
   a first and second reflector with radii of curvature $R_1$ and $R_2$ operative to couple a portion of coherent light energy at the second frequency to the outside of the resonator and to reflect remainder light to the second side along the beam path back into said prism gain module at an angle of $\tan^{-1} n$ on the module's first side; and
   means for focusing the coherent light energy generated by said pump means onto the beam path within the prism gain module.

5. The prism gain module resonator as recited in claim 4 further comprising a reflective material coated along a portion of the surface of the first and second sides, said reflective coating reflecting coherent light energy at the second frequency within said prism gain module along said beam path back into the module.

6. The prism gain module as recited in claim 5 wherein said beam path enters said module through the first side and extends to said second side, reflects off of said second side to said first side, reflects off of said first surface and exits out of said second side, wherein said reflective material covers a portion of the surface of the first and second side where the beam path intersects and reflects off of said first and second side, and wherein the portion of the module first and second surface where the beam path exits or enters said module remains uncovered by the reflective material.

7. The prism gain module resonator as recited in claim 4 wherein said focusing means includes means for focusing the coherent light energy at the first frequency in the module through a third side and means for focusing coherent light energy at the first frequency in the module through either the first or second side.

8. The prism gain module resonator as recited in claim 4 wherein the distance along the beam path between the location where the beam reflects off of the first side and the location where the beam reflects off of the second side is defined by D; and
   wherein the distance between the location on the second side where the beam reflects off of the first surface is defined by L, and wherein $L = D \cos((\pi - 2\tan^{-1} n)/6)/(\sin(\tan^{-1} n))$.

9. The prism gain module resonator as recited in claim 8 wherein the distance along the beam path between the reflectors is defined by "A", wherein the distance along the beam path between the first reflector and the first surface is defined by B; and wherein $B = (A - L)/(2\cos((8\tan^{-1} n - \pi)/6))$.

10. A method of amplifying a beam of coherent light energy having a first predetermined frequency, the method comprising the steps of:
    providing a prism gain module with a refractive index of n and having a first side with a first planar surface and a second side with a second planar surface;
    positioning the first planar surface at an angle with respect to the second planar surface such that the plane of the first surface intersects the plane of the second surface;
    positioning the angle in radians between the first and second planar surface at $(\pi - 2\tan^{-1} n)/3$;
    directing the beam of coherent light energy through the first side along a path in the gain module and off the second side;
    coating with a material reflective at a predetermined frequency a portion of the first and second planar surface such that the path in the gain module contacts the reflective material; and
    pumping the gain module with coherent light energy at a second predetermined frequency to amplify the beam of coherent light energy in the gain module at the first predetermined frequency.

11. The method as recited in claim 10 further comprising the steps of focusing the coherent light energy at the second frequency through two or more sides selected from the group consisting of the first side, the second side and the third side onto the path within the gain module.

12. The method as recited in claim 10 further comprising the step of placing an optical diode between the first reflector and second reflector to limit the coherent light energy directed along the path to a single frequency.

13. The method as recited in claim 10 further comprising the steps of:
    reflecting the coherent light energy beam off of the reflective coating within the module; and
    maintaining an angle between the beam contacting the reflective material and the beam reflected off of the reflective material at $(\pi - 2\tan^{-1} n)/3$.

* * * * *